United States Patent
Kanbayashi

(10) Patent No.: US 9,335,961 B2
(45) Date of Patent: May 10, 2016

(54) PRINTING SYSTEM AND INFORMATION PROCESSING APPARATUS

(71) Applicant: KYOCERA Document Solutions Inc., Osaka-shi, Osaka (JP)

(72) Inventor: Ryo Kanbayashi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/470,781

(22) Filed: Aug. 27, 2014

(65) Prior Publication Data

US 2015/0062636 A1 Mar. 5, 2015

(30) Foreign Application Priority Data

Aug. 30, 2013 (JP) .................................. 2013-179264

(51) Int. Cl.
*G06F 3/12* (2006.01)
*G06F 21/60* (2013.01)
*H04L 29/06* (2006.01)

(52) U.S. Cl.
CPC ............ *G06F 3/1268* (2013.01); *G06F 3/1203* (2013.01); *G06F 3/1222* (2013.01); *G06F 3/1238* (2013.01); *G06F 3/1267* (2013.01); *G06F 3/1285* (2013.01);
(Continued)

(58) Field of Classification Search
CPC ... G06F 3/1268; G06F 3/1203; G06F 3/1285; G06F 3/1222; G06F 3/1238; G06F 21/608; G06F 3/1292; G06F 3/1267; G06F 3/1204; H04L 63/10; H04L 63/0807

USPC ................................................ 358/1.13–1.16
See application file for complete search history.

(56) References Cited

U.S. PATENT DOCUMENTS

2002/0032748 A1 3/2002 Myojo
2004/0165211 A1 8/2004 Herrmann et al.
(Continued)

FOREIGN PATENT DOCUMENTS

JP H07125911 A 5/1995
JP 2001219627 A 8/2001
(Continued)

OTHER PUBLICATIONS

European Patent Office, Extended European Search Report Issued in European Patent Application No. 14182450.8, Jan. 8, 2015, 7 pages.

*Primary Examiner* — Kent Yip
(74) *Attorney, Agent, or Firm* — Alleman Hall McCoy Russell & Tuttle LLP

(57) ABSTRACT

In an information processing apparatus, a data transmission portion transmits print data to an image forming apparatus, and a first detection portion detects communication terminals existing in a communication range of a near field wireless communication. In addition, a terminal selection portion selects one or a plurality of communication terminals from among the communication terminals detected by the first detection portion, and an authorization portion gives print authority of the print data transmitted from the data transmission portion, to the communication terminal selected by the terminal selection portion. On the other hand, in an image forming apparatus, a printing permission portion permits printing of the print data corresponding to the print authority, when the communication terminal having the print authority exists in the communication range of the near field wireless communication.

6 Claims, 7 Drawing Sheets

(52) U.S. Cl.
CPC ........... *G06F 3/1292* (2013.01); *G06F 21/608* (2013.01); *H04L 63/0807* (2013.01); *H04L 63/10* (2013.01); *G06F 3/1204* (2013.01)

(56) References Cited

U.S. PATENT DOCUMENTS

| | | |
|---|---|---|
| 2011/0205578 A1 | 8/2011 | Gouda |
| 2012/0268770 A1 | 10/2012 | Fukuda |
| 2012/0307284 A1 | 12/2012 | Chien |
| 2013/0027741 A1* | 1/2013 | Liu .............................. 358/1.15 |
| 2014/0070002 A1* | 3/2014 | Pineau et al. ................. 235/382 |
| 2014/0293314 A1* | 10/2014 | Amarendra ............ G06F 21/35 358/1.14 |

FOREIGN PATENT DOCUMENTS

| | | |
|---|---|---|
| JP | 2006260023 A | 9/2006 |
| JP | 2009066929 A | 4/2009 |
| JP | 2011172046 A | 9/2011 |
| JP | 2012224000 A | 11/2012 |
| NO | 0294604 A | 3/2002 |

* cited by examiner

PRINTING SYSTEM AND INFORMATION PROCESSING APPARATUS

INCORPORATION BY REFERENCE

This application is based upon and claims the benefit of priority from the corresponding Japanese Patent Application No. 2013-179264 filed on Aug. 30, 2013, the entire contents of which are incorporated herein by reference.

BACKGROUND

The present disclosure relates to a printing system including an information processing apparatus and an image forming apparatus.

In corporate offices and the like, there are cases where print data having high confidentiality is printed by an image forming apparatus such as a printer. When such print data is printed by using a printing system including an information processing apparatus such as a personal computer and an image forming apparatus, there is a possibility that the content of a printed matter outputted from the image forming apparatus is seen by a third person. Therefore, a printing system having a function called "confidential printing" is generally known, in which execution of a printing process for print data transmitted from the information processing apparatus is temporarily suspended on the image forming apparatus side, and when a user performs, on the image forming apparatus, an operation to execute the printing process, the image forming apparatus is caused to print the print data.

By the way, when print data is printed by using the confidential printing function, the user needs to go to the place where the image forming apparatus is installed and perform the operation to execute a printing process. Meanwhile, a situation is assumed where the user doesn't care if the content of the print data is seen by another specific user in the same department or the like. In light of such situation, in a printing system having the confidential printing function, there has been known a technique in which another user can execute, by proxy, printing of print data transmitted to the image forming apparatus. Thus, a user can request another user sitting near him/her to execute proxy printing.

SUMMARY

A printing system according to an aspect of the present disclosure includes an information processing apparatus and an image forming apparatus. The information processing apparatus includes a data transmission portion, a first detection portion, a terminal selection portion, and an authorization portion. The data transmission portion transmits print data to the image forming apparatus. The first detection portion detects communication terminals existing in a communication range of a near field wireless communication. The terminal selection portion selects one or a plurality of the communication terminals from among the communication terminals detected by the first detection portion. The authorization portion gives print authority of the print data transmitted from the data transmission portion, to the communication terminal selected by the terminal selection portion. The image forming apparatus includes a printing permission portion. The printing permission portion permits printing of the print data corresponding to the print authority, when the communication terminal having the print authority exists in the communication range of the near field wireless communication.

An information processing apparatus according to another aspect of the present disclosure includes a data transmission portion, a first detection portion, a terminal selection portion, and an authorization portion. The data transmission portion transmits print data to an image forming apparatus. The first detection portion detects communication terminals existing in a communication range of a near field wireless communication. The terminal selection portion selects one or a plurality of the communication terminals from among the communication terminals detected by the first detection portion. The authorization portion gives print authority of the print data transmitted from the data transmission portion, to the communication terminal selected by the terminal selection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described for the understanding of the present disclosure. It should be noted that the following embodiments are specific examples of the present disclosure, but do not limit the technical scope of the present disclosure.

[Printing System 100]

Figure 1:
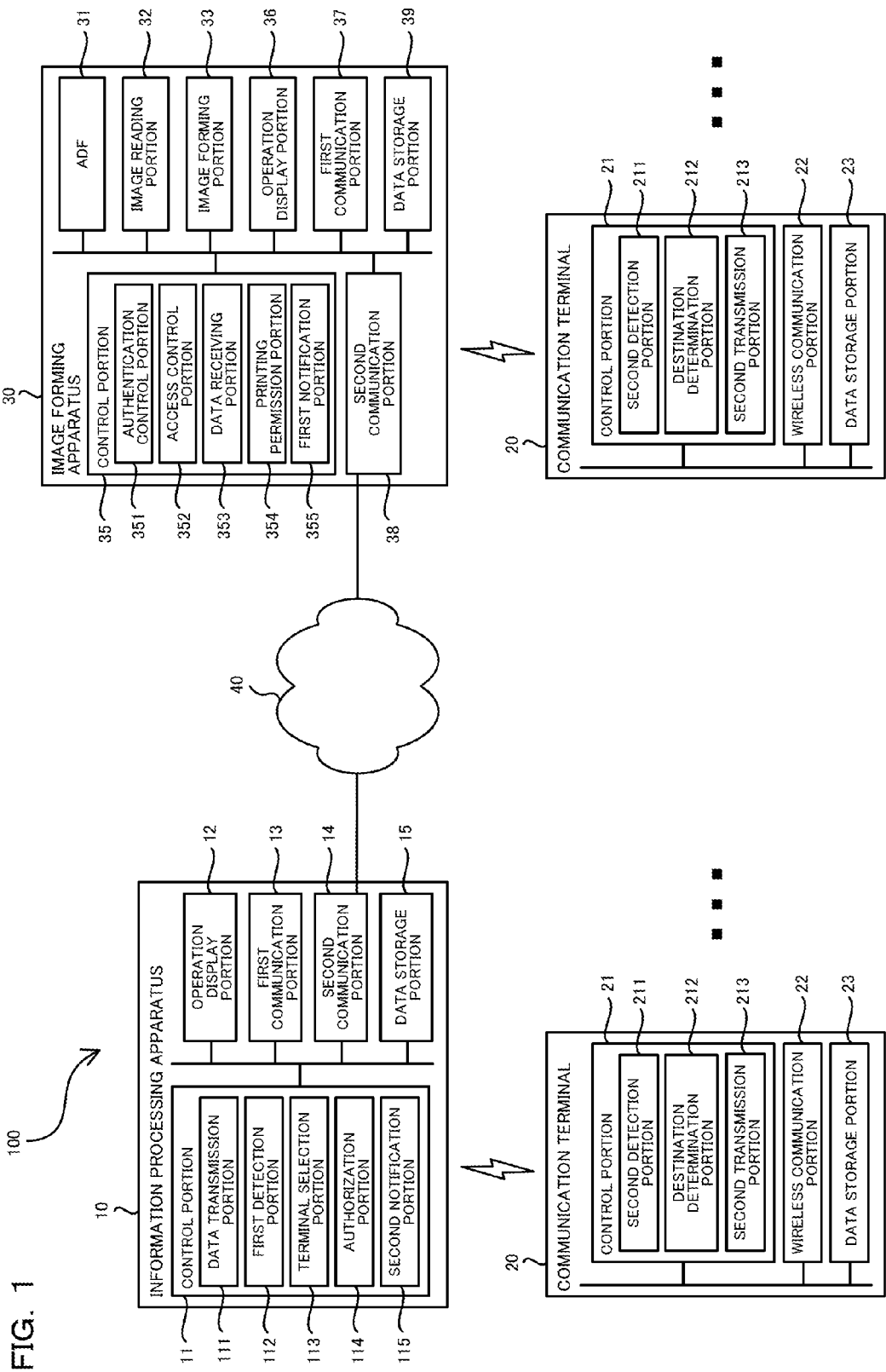
FIG. 1 is a schematic configuration diagram showing a printing system according to an embodiment of the present disclosure.

A printing system 100 according to an embodiment of the present disclosure includes, as shown in FIG. 1, an information processing apparatus 10, one or a plurality of communication terminals 20, and an image forming apparatus 30. The information processing apparatus 10 and the image forming apparatus 30 are connectable to each other via a communication network 40 such as the Internet or a LAN. In addition, the information processing apparatus 10, the communication terminals 20, and the image forming apparatus 30 are communicable with each other in accordance with the wireless communication standard of Bluetooth (trademark).

[Information Processing Apparatus 10]

The information processing apparatus 10 is, as shown in FIG. 1, a personal computer or the like including a control portion 11, an operation display portion 12, a first communication portion 13, a second communication portion 14, and a data storage portion 15. The information processing apparatus 10 may be a smartphone, a cellular phone, a tablet terminal, a PDA, or the like.

The control portion 11 includes not-illustrated control devices such as a CPU, a ROM, a RAM, an EEPROM, and the like. The CPU is a processor that executes various kinds of arithmetic processing. The ROM is a nonvolatile storage portion in which information such as control programs to cause the CPU to perform various kinds of processing is prestored. The RAM is a volatile storage portion, and the EEPROM is a nonvolatile storage portion. The RAM and the EEPROM are used as temporary storage memories (work spaces) for the various kinds of processing to be performed by the CPU. The control portion 11 performs overall control of the information processing apparatus 10 by executing various control programs prestored in the ROM or the data storage portion 15 by means of the CPU. The control portion 11 may be composed of an electronic circuit such as an integrated circuit (ASIC).

The operation display portion 12 includes a display portion such as a liquid crystal display that displays various kinds of information in accordance with a control instruction from the control portion 11, and an operation portion such as keyboard and a mouse that receives various kinds of input operations performed by a user.

The first communication portion 13 executes wireless data communication with external communication apparatuses such as the communication terminals 20, in accordance with a predetermined communication protocol defined in the Bluetooth. For example, the first communication portion 13 can execute wireless communication based on the Bluetooth with the external communication apparatus existing within a range of about 10 m with a field intensity (2.5 mW) called "Class 2". Since the Bluetooth data communication scheme has been well known, description thereof will be omitted.

In the information processing apparatus 10, pairing, which is a communication partner authentication procedure in the Bluetooth communication, has previously been executed with a plurality of communication terminals 20. In the pairing, pairing IDs required for authentication of communication partners are exchanged between the communication apparatuses. Then, the pairing ID of the communication terminal 20, which has been obtained by the information processing apparatus 10 in the pairing, is stored in the data storage portion 15. After the pairing, the information processing apparatus 10 and the communication terminal 20 are allowed to perform data communication therebetween.

The second communication portion 14 executes, wirelessly or via a cable, data communication with an external communication apparatus such as the image forming apparatus 30 via the communication network 40.

The data storage portion 15 is a storage portion such as a solid state drive (SSD) or a hard disk drive (HDD), and data can be read from and written in the data storage portion 15 by the control portion 11. In the data storage portion 15, the pairing ID of the communication terminal 20 is stored in association with a user of the communication terminal 20. In addition, in the data storage portion 15, the print data to be printed by the image forming apparatus 30 can also be stored.

Figure 3:
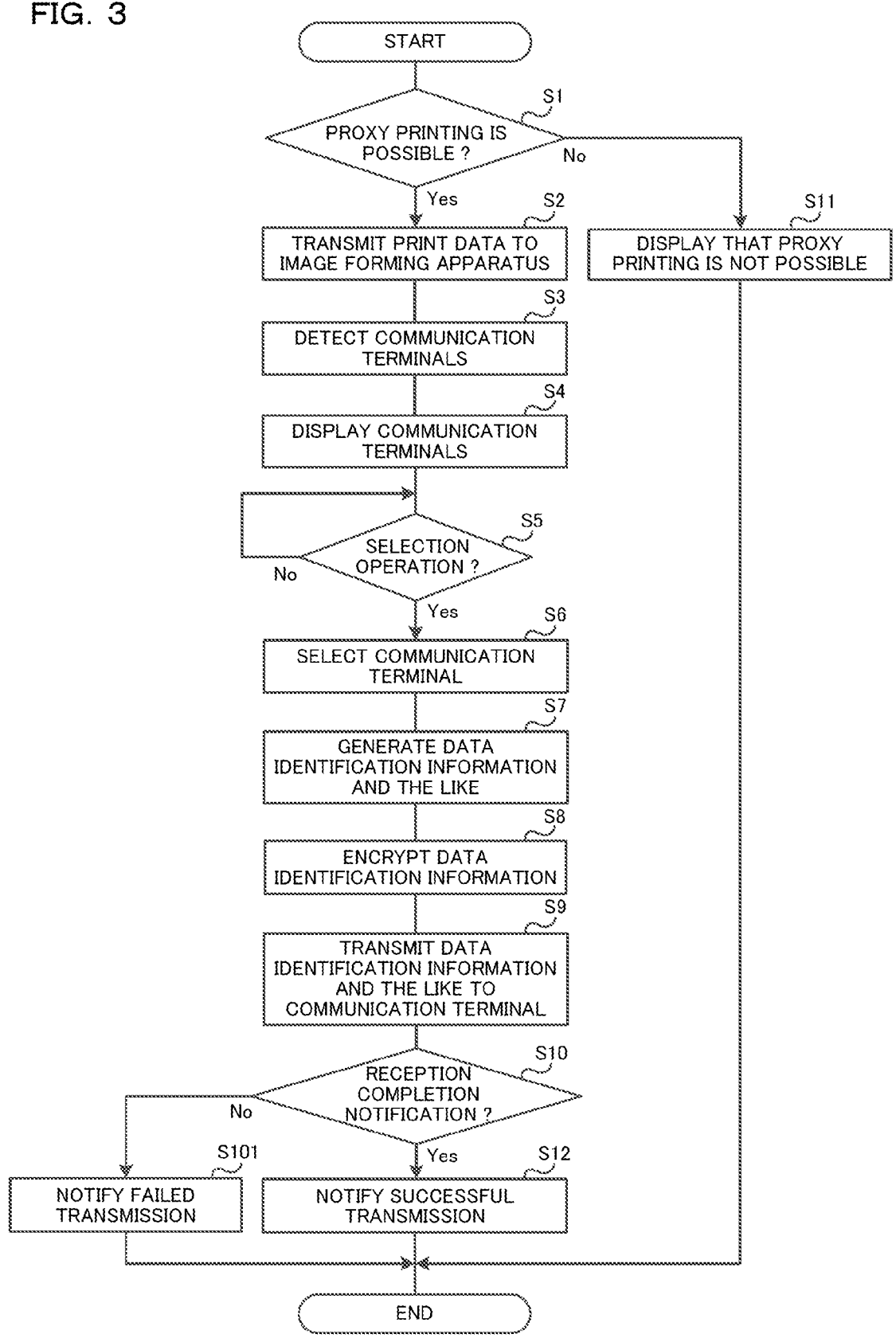
FIG. 3 is a flowchart showing an authorization process executed by an information processing apparatus according to the embodiment of the present disclosure.

Further, in the data storage portion 15, an authentication program has been prestored, which causes the CPU of the control portion 11 to execute a later-described authorization process (refer to the flowchart of FIG. 3). The authentication program may be stored in a computer-readable storage medium such as a CD, a DVD, a flash memory, or the like, and may be installed from the storage medium into a storage portion such as the data storage portion 15. The present disclosure may be understood as a computer-readable storage medium in which the authentication program is stored.

As shown in FIG. 1, the control portion 11 includes a data transmission portion 111, a first detection portion 112, a terminal selection portion 113, an authorization portion 114, and a second notification portion 115. The control portion 11 executes, by using the CPU, the authentication program stored in the data storage portion 15, thereby acting as the data transmission portion 111, the first detection portion 112, the terminal selection portion 113, the authorization portion 114, and the second notification portion 115. The control portion 11 acting as each of the data transmission portion 111, the first detection portion 112, the terminal selection portion 113, the authorization portion 114, and the second notification portion 115 is an example of each of a data transmission portion, a first detection portion, a terminal selection portion, an authorization portion, and a second notification portion.

The data transmission portion 111 transmits the print data stored in the data storage portion 15, to the image forming apparatus 30 connected via the communication network 40.

The first detection portion 112 detects communication terminals 20 existing in a communication range of near field wireless communication. Specifically, the first detection portion 112 detects whether there is a communication terminal 20 whose pairing ID is stored in the data storage portion 15, as an apparatus capable of Bluetooth communication in the Bluetooth communication range. The communication range is a range in which the first communication portion 13 can execute Bluetooth wireless communication with the external communication apparatus, that is, about 10 m. The Bluetooth wireless communication is an example of the near field wireless communication.

The terminal selection portion 113 selects one or a plurality of communication terminals 20 from among the communication terminals 20 detected by the first detection portion 112. Specifically, the terminal selection portion 113 selects one or a plurality of communication terminals 20 from among the communication terminals 20 detected by the first detection portion 112, in accordance with a preset selection operation. For example, the terminal selection portion 113 causes the operation display portion 12 to display the communication terminals 20 detected by the first detection portion 112, in a selectable manner, together with the usernames of the users thereof. Thereby, the user of the information processing apparatus 10 is allowed to perform, using a keyboard or a mouse, a selection operation on the communication terminals 20 displayed on the operation display portion 12. The selection operation performed using a keyboard or a mouse on the communication terminals 20 displayed in a selectable manner on the operation display portion 12 is an example of the selection operation.

The authorization portion 114 gives print authority of the print data transmitted from the data transmission portion 111, to the communication terminal 20 selected by the terminal selection portion 113. Specifically, the authorization portion 114 transmits data identification information for identifying the print data transmitted from the data transmission portion 111 and destination information indicating the destination of the print data, to the communication terminal 20 selected by the terminal selection portion 113, thereby giving the print authority of the print data to the communication terminal 20. For example, the data identification information includes the filename of the print data, the username of the user corresponding to the information processing apparatus 10 that has transmitted the print data, and the like. Hereinafter, the user corresponding to the information processing apparatus 10 that has transmitted the print data and who is a requester requesting printing of the print data in proxy printing, is referred to as a first user. The destination information is, for example, the pairing ID of the image forming apparatus 30.

When the print data corresponding to the print authority is printed by the image forming apparatus 30, the second notification portion 115 gives notice of the user corresponding to the communication terminal 20 that is specified in the image forming apparatus 30 and is given the print authority. Hereinafter, the user corresponding to the communication terminal 20 that is given the print authority and who is a proxy requested by the first user to perform printing of the print data, is referred to as a second user. For example, the second notification portion 115 displays, on the operation display portion 12, that the print data corresponding to the print authority has been printed, and the username of the second user.

[Communication Terminal 20]

As shown in FIG. 1, the communication terminal 20 includes a control portion 21, a wireless communication portion 22, and a data storage portion 23. The communication terminal 20 is a mobile communication terminal carried by a user or the like, such as a smartphone, a cellular phone, a tablet terminal, a PDA, or the like.

The control portion 21 includes not-illustrated control devices such as a CPU, a ROM, a RAM, an EEPROM, and the like. The CPU is a processor that executes various kinds of arithmetic processing. The ROM is a nonvolatile storage portion in which information such as control programs to cause the CPU to perform various kinds of processing is prestored. The RAM is a volatile storage portion, and the EEPROM is a nonvolatile storage portion. The RAM and the EEPROM are used as temporary storage memories (work spaces) for the various kinds of processing to be performed by the CPU. The control portion 21 performs overall control of the communication terminal 20 by executing various control programs prestored in the ROM or the data storage portion 23 by means of the CPU. The control portion 21 may be composed of an electronic circuit such as an integrated circuit (ASIC), or may be a control portion provided separately from a main control portion that performs overall control of the communication terminal 20.

The wireless communication portion 22 executes a communication process with an external communication apparatus such as the information processing apparatus 10 or the image forming apparatus 30, in accordance with a communication protocol defined in the Bluetooth, For example, the wireless communication portion 22 can execute wireless communication based on the Bluetooth, with the external communication apparatus existing in a communication range of about 10 m from the communication terminal 20 with a field intensity called "Class 2", like the information processing apparatus 10. In the communication terminal 20, pairing has previously been executed with the information processing apparatus 10 and with the image forming apparatus 30, and the pairing ID of the information processing apparatus 10 and the pairing ID of the image forming apparatus 30 are stored in the data storage portion 23.

The data storage portion 23 is a nonvolatile storage portion such as a flash memory, and data can be written in and read from the data storage portion 23 by the control portion 21. The pairing ID of the information processing apparatus 10 and the pairing ID of the image forming apparatus 30 are stored in the data storage portion 23. In addition, the data identification information and the destination information, which have been transmitted from the information processing apparatus 10, are stored in the data storage portion 23.

Figure 4:
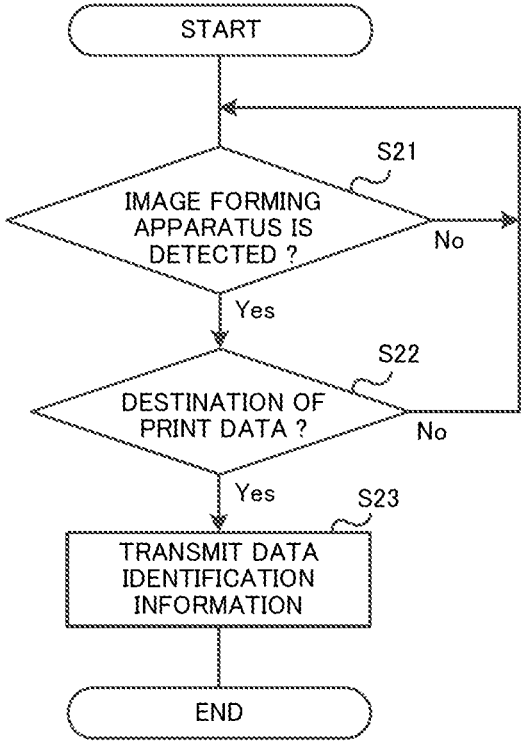
FIG. 4 is a flowchart showing a destination determination process executed by a communication terminal according to the embodiment of the present disclosure.

Further, in the data storage portion 23, a destination determination program has previously been stored, which causes the CPU of the control portion 21 to execute a later-described destination determination process (refer to the flowchart of FIG. 4). The destination determination program may be stored in a computer-readable storage medium such as a CD, a DVD, or a flash memory, and may be installed from the storage medium into a storage portion such as the data storage portion 23.

As shown in FIG. 1, the control portion 21 includes a second detection portion 211, a destination determination portion 212, and a second transmission portion 213. The control portion 21 acts as the second detection portion 211, the destination determination portion 212, and the second transmission portion 213 by executing, with the CPU, the destination determination program stored in the data storage portion 23.

The second detection portion 211 detects the image forming apparatus 30 existing in the communication range of the near field wireless communication. Specifically, the second detection portion 211 detects whether or not there is the image forming apparatus 30 whose pairing ID is stored in the data storage portion 23, as an apparatus capable of Bluetooth communication in the Bluetooth communication range.

The destination determination portion 212 determines, based on the destination information, whether or not the image forming apparatus 30 detected by the second detection portion 211 is the destination of the print data. Specifically, if the destination information is the pairing ID of the image forming apparatus 30, the destination determination portion 212 determines that the image forming apparatus 30 is the destination of the print data when the destination information matches the pairing ID of the image forming apparatus 30 detected by the second detection portion 211.

The second transmission portion 213 transmits the data identification information to the image forming apparatus 30 that is determined to be the destination of the print data by the destination determination portion 212.

[Image Forming Apparatus 30]

Figure 2:
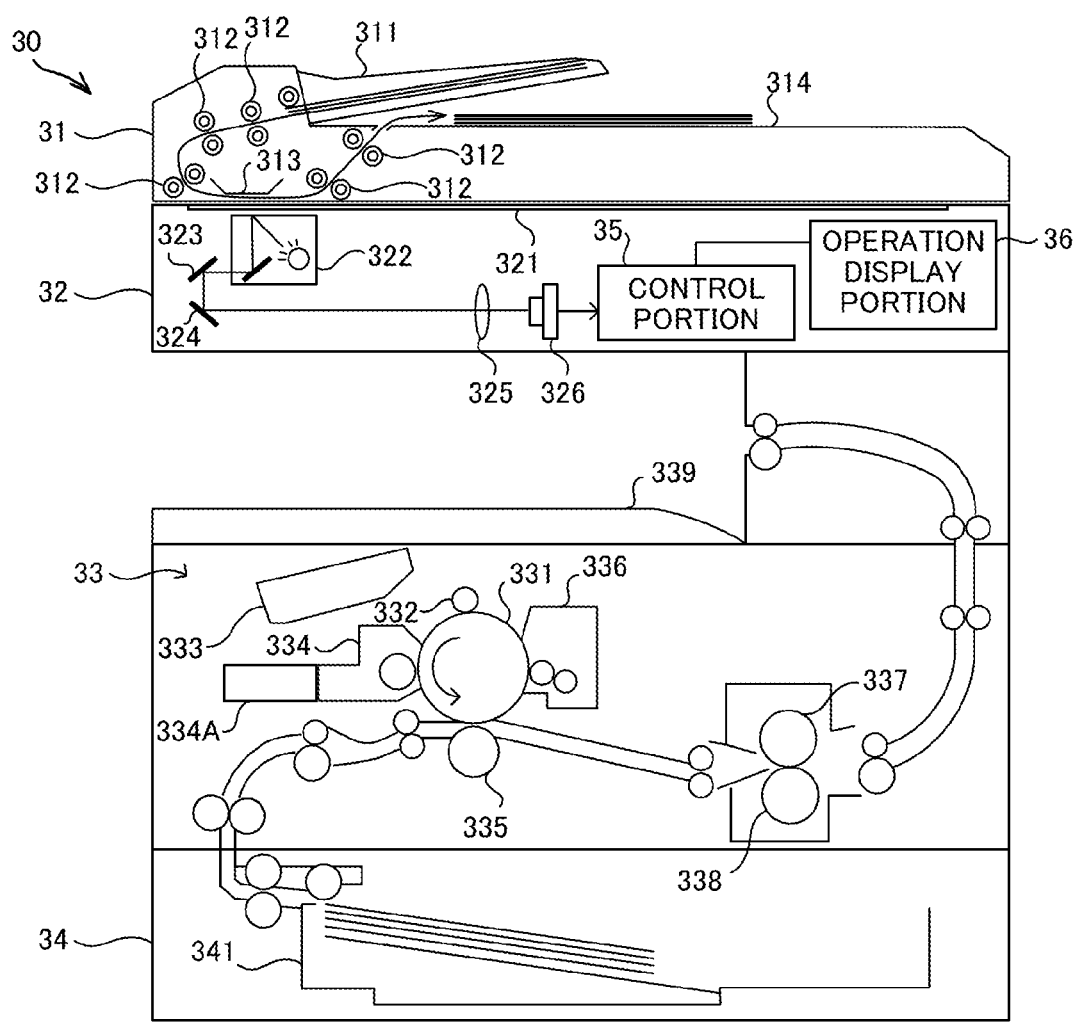
FIG. 2 is a schematic configuration diagram showing an image forming apparatus according to the embodiment of the present disclosure.

As shown in FIGS. 1 and 2, the image forming apparatus 30 includes an ADF 31, an image reading portion 32, an image forming portion 33, a sheet feed portion 34, a control portion 35, an operation display portion 36, a first communication portion 37, a second communication portion 38, and a data storage portion 39. The image forming apparatus 30 is a multifunction peripheral having a plurality of functions such as a scan function for reading image data from a document sheet, a printer function, a facsimile function, a copy function, and the like. In addition, the image forming apparatus 30 may be an image forming apparatus such as a printer capable of printing the print data transmitted from the information processing apparatus 10.

As shown in FIG. 2, the ADF 31 is an automatic document feeder including a document set portion 311, a plurality of conveying rollers 312, a document holder 313, and a sheet discharge portion 314. In the ADF 31, each of the conveying rollers 312 is driven by a not-illustrated motor, whereby a document sheet placed on the document set portion 311 is conveyed through a reading position for the image data by the image reading portion 32 to the sheet discharge portion 314.

Thus, the image reading portion 32 can read the image data from the document sheet conveyed by the ADF 31.

As shown in FIG. 2, the image reading portion 32 includes a document table 321, a reading unit 322, mirrors 323 and 324, an optical lens 325, and a CCD (Charge Coupled Device) 326. The document table 321 is a document placement portion provided on an upper surface of the image reading portion 32. The reading unit 322 includes an LED light source and a mirror, and is movable in a sub-scanning direction (right-left direction in FIG. 2) by a not-illustrated motor. The LED light source includes a plurality of white LEDs arranged along a main-scanning direction (depth direction in FIG. 2). The mirror reflects, toward the mirror 323, light emitted from the LED light source and reflected at the surface of the document sheet placed at the reading position on the document table 321. Then, the light reflected by the mirror of the reading unit 322 is guided to the optical lens 325 by the mirrors 323 and 324. The optical lens 325 converges the incident light into the CCD 326. The CCD 326 includes a photoelectric conversion element and the like for inputting, to the control portion 35, an electric signal corresponding to the reception amount of the incident light from the optical lens 325, as image data of the document sheet.

The image forming portion 33 is an electrophotographic type image forming portion that executes an image forming process (printing process) based on image data read by the image reading portion 32 or image data input from the information processing apparatus 10 or the like. Specifically, as shown in FIG. 2, the image forming portion 33 includes a photosensitive drum 331, a charging device 332, an exposure device (LSU) 333, a developing device 334, a transfer roller 335, a cleaning device 336, a fixing roller 337, a pressure roller 338, and a sheet discharge tray 339. In the image forming portion 33, an image is formed, according to the following procedure, on a sheet supplied from a sheet feed cassette 341 detachably mounted to the sheet feed portion 34, and the sheet on which the image has been formed is discharged into the sheet discharge tray 339.

First, the photosensitive drum 331 is uniformly charged at a predetermined potential by the charging device 332. Next, light based on the image data is applied to the surface of the photosensitive drum 331 by the exposure device 333. Thereby, an electrostatic latent image corresponding to the image data is formed on the surface of the photosensitive drum 331. Then, the electrostatic latent image on the photosensitive drum 331 is developed (visualized) as a toner image by the developing device 334. It is noted that a toner (developer) is supplied to the developing device 334 from a toner container 334A detachably mounted to the image forming portion 33. Subsequently, the toner image formed on the photosensitive drum 331 is transferred to a sheet by the transfer roller 335. Thereafter, the toner image transferred to the sheet is heated, and fused and fixed onto the sheet by the fixing roller 337 when the sheet passes between the fixing roller 337 and the pressure roller 338. The toner remaining on the surface of the photosensitive drum 331 is removed by the cleaning device 336.

The control portion 35 includes not-illustrated control devices such as a CPU, a ROM, a RAM, an EEPROM, and the like. The CPU is a processor that executes various kinds of arithmetic processing. The ROM is a nonvolatile storage portion in which information such as control programs to cause the CPU to perform various kinds of processing is prestored. The RAM is a volatile storage portion, and the EEPROM is a nonvolatile storage portion. The RAM and the EEPROM are used as temporary storage memories (work spaces) for the various kinds of processing to be performed by the CPU. The control portion 35 performs overall control of the image forming apparatus 30 by executing various control programs prestored in the ROM by means of the CPU. The control portion 35 may be composed of an electronic circuit such as an integrated circuit (ASIC), or may be a control portion provided separately from a main control portion that performs overall control of the image forming apparatus 30.

The operation display portion 36 includes a display portion such as a liquid crystal display that displays various kinds of information in accordance with a control instruction from the control portion 35, and an operation portion such as a hardware key or a touch panel that allows input, to the control portion 35, of the various kinds of information in accordance with operations of users.

The first communication portion 37 executes a communication process with an external communication apparatus such as the communication terminal 20 in accordance with a communication protocol defined in the Bluetooth. For example, the first communication portion 37 can execute wireless communication based on the Bluetooth, with the external communication apparatus existing in a communication range of about 10 m from the image forming apparatus 30 with a field intensity called "Class 2", like the communication terminal 20. In the image forming apparatus 30, pairing has previously been executed with the communication terminal 20, and the pairing ID of the communication terminal 20 is stored in the data storage portion 39.

The second communication portion 38 executes, wirelessly or via a cable, data communication with an external communication apparatus such as the information processing apparatus 10 via the communication network 40.

The data storage portion 39 is a storage portion such as a solid state drive (SSD) or a hard disk drive (HDD). The data storage portion 39 has a plurality of storage regions (hereinafter referred to as "boxes") corresponding to users of the image forming apparatus 30, in which the print data transmitted from the information processing apparatus 10 is stored. In addition, the data storage portion 39 stores therein authentication information used for allowing each user to log in according to a preset authentication operation. Specifically, the authentication information is a username and a password previously determined for each user. In addition, the data storage portion 39 stores therein the pairing IDs of the communication terminals 20 and apparatus identification information indicating the information processing apparatus 10 in association with the users of the image forming apparatus 30. For example, the apparatus identification information is an IP address of the information processing apparatus 10 in the communication network 40.

Further, the data storage portion 39 prestores therein a printing permission program that allows the CPU of the control portion 35 to perform a later-described print data reception process (refer to the flowchart of FIG. 5) and a later-described printing permission process (refer to the flowchart of FIG. 6). It is noted that the printing permission program may be stored in a computer-readable storage medium such as a CD, a DVD, or a flash memory, and may be installed from the storage medium into a storage portion such as the data storage portion 39.

As shown in FIG. 1, the control portion 35 includes an authentication control portion 351, an access control portion 352, a data receiving portion 353, a printing permission portion 354, and a first notification portion 355. The control portion 35 acts as the authentication control portion 351, the access control portion 352, the data receiving portion 353, the printing permission portion 354, and the first notification portion 355 by executing, with the CPU, the printing permission program stored in the data storage portion 39. The control portion 35 acting as each of the authentication control portion 351, the access control portion 352, the data receiving portion 353, the printing permission portion 354, and the first notification portion 355 is an example of each of an authentication control portion, an access control portion, a data receiving portion, a printing permission portion, and a first notification portion.

The authentication control portion 351 executes an authentication process of allowing a user to log in according to the preset authentication operation. Specifically, the authentication control portion 351 causes the operation display portion 36 to display an authentication screen for the authentication operation, according to need. Then, the authentication control portion 351 receives, on the authentication screen, an input operation of login information to the operation display portion 36 by the user. The input operation is an example of the authentication operation. Thereafter, when the login information inputted from the operation display portion 36 is included in the authentication information, the authentication control portion 351 determines that authentication is completed, and causes the user to log in to the image forming apparatus 30. When a logout operation is performed on the operation display portion 36, or when a preset time has elapsed, or when another user is allowed to log in, the authentication control portion 351 executes a logout process to cause the currently logged-in user to log out.

When there is a login performed by the authentication control portion 351, the access control portion 352 allows access to the box corresponding to the user who has logged in.

When the print data is transmitted from the information processing apparatus 10, the data receiving portion 353 specifies the first user corresponding to the information processing apparatus 10, and stores the print data in the box corresponding to the first user. Specifically, based on the apparatus identification information of the information processing apparatus 10 that has transmitted the print data, the data receiving portion 353 specifies, as the first user, a user, corresponding to the information processing apparatus 10, of the image forming apparatus 30.

When the communication terminal 20 having the print authority exists in the communication range of the near field wireless communication, the printing permission portion 354 permits printing of the print data corresponding to the print authority. Specifically, when the data identification information is transmitted from the communication terminal 20, the printing permission portion 354 determines that the communication terminal 20 having the print authority exists in the communication range of the near field wireless communication, and permits printing of the print data corresponding to the data identification information. Further, the printing permission portion 354 specifies the second user corresponding to the communication terminal 20, and stores, in the box corresponding to the second user, the print data corresponding to the data identification information transmitted from the communication terminal 20, thereby permitting printing of the print data corresponding to the print authority. Specifically, based on the pairing ID of the communication terminal 20 that has transmitted the data identification information, the printing permission portion 354 specifies, as the second user, a user, corresponding to the communication terminal 20, of the image forming apparatus 30.

Further, the printing permission portion 354 deletes the print data stored in the box corresponding to the second user, from the box corresponding to the second user, on the condition that the second user has logged out or a preset time limit has been exceeded. For example, the time limit is set based on a time period that seems to be required from when the print data is stored in the box corresponding to the second user to when the second user logs in to the image forming apparatus 30.

When the print data corresponding to the print authority has been printed, the first notification portion 355 gives notice of the first user. For example, the first notification portion 355 gives notice of the first user by displaying the username of the first user on the operation display portion 36.

When the print data corresponding to the print authority has been printed, the control portion 35 transmits information indicating the second user to the information processing apparatus 10 corresponding to the first user. Thereby, when the information indicating the second user is transmitted from the image forming apparatus 30, the second notification portion 115 of the information processing apparatus 10 gives notice of the second user. For example, the information indicating the second user is the pairing ID of the communication terminal 20 corresponding to the second user.

In the printing system 100 described above, as a method of printing the print data, any of normal printing, confidential printing, and proxy printing can be selected. In the normal printing, the print data transmitted from the information processing apparatus 10 is immediately printed in the image forming apparatus 30. In the confidential printing, the print data transmitted from the information processing apparatus 10 can be printed by only the first user corresponding to the information processing apparatus 10. In the proxy printing, the print data transmitted from the information processing apparatus 10 can be printed by the first user, and the second user corresponding to the communication terminal 20 that is given the print authority.

In the print data that can be printed in the printing system 100, a predetermined security level is set according to the confidentiality of the print data, and the printing method adoptable in the printing system 100 is limited depending on the security level. Such a limitation process is executed by the control portion 11 of the information processing apparatus 10. For example, three stages of security levels, "high", "middle", and "low", are set. As for the print data having the security level of "high", use of the printing methods other than the confidential printing is inhibited in the printing system 100. As for the print data having the security level of "middle", either the confidential printing or the proxy printing can be used in the printing system 100. As for the print data having the security level of "low", any of the confidential printing, the proxy printing, and the normal printing can be used in the printing system 100.

When the proxy printing is selected as a printing method for the print data in the printing system 100, the information processing apparatus 10 executes the later-described authorization process. In addition, the communication terminal 20 executes the later-described destination determination process. Further, the image forming apparatus 30 executes the later-described print data reception process and the later-described printing permission process. Hereinafter, the authorization process, the destination determination process, the print data reception process, and the printing permission process will be described.

[Authorization Process]

First, with reference to FIG. 3, an example of the procedure of the authorization process to be executed by the control portion 11 in the information processing apparatus 10 will be described. The control portion 11 executes the authorization process when the user of the information processing apparatus 10 performs, on the operation display portion 12, an operation input for printing of the print data, with the proxy printing being selected by the user as the printing execution method.

<Step S1>

First, in step S1, the control portion 11 determines whether or not the print data can be printed by the proxy printing. Specifically, the control portion 11 determines that the print data can be printed by the proxy printing when the security level set in the print data is "middle" or "low".

When determining that the print data can be printed by the proxy printing (Yes in S1), the control portion 11 advances the processing to step S2. On the other hand, when determining that the print data cannot be printed by the proxy printing (No in S1), the control portion 11 advances the processing to step S11.

<Step S11>

In step S11, the control portion 11 displays, on the operation display portion 12, that the print data cannot be printed by the proxy printing, and ends the authorization process.

<Step S2>

In step S2, the data transmission portion 111 transmits the print data to the image forming apparatus 30. Specifically, the data transmission portion 111 transmits the print data to the image forming apparatus 30 designated by the user of the information processing apparatus 10.

<Step S3>

In step S3, the first detection portion 112 detects the communication terminals 20 existing in the communication range of the near field wireless communication. Specifically, the first detection portion 112 detects the communication terminals 20 existing in the Bluetooth communication range.

<Step S4>

In step S4, the control portion 11 causes the operation display portion 12 to display the communication terminals 20 detected in step S3 together with the usernames of the users of the communication terminals 20. If no communication terminal 20 has been detected in step S3, the control portion 11 causes the operation display portion 12 to display that no communication terminal 20 has been detected.

<Step S5>

In step S5, the control portion 11 determines whether or not the selection operation has been performed on the communication terminals 20 displayed on the operation display portion 12 in step S4.

When determining that the selection operation has been performed (Yes in S5), the control portion 11 advances the processing to step S6. When the selection operation has not been performed (No in S5), the control portion 11 waits for the selection operation in step S5.

<Step S6>

In step S6, the terminal selection portion 113 selects one or a plurality of communication terminals 20 on which the selection operation has been performed in step S5, as a target (targets) to be given the print authority of the print data.

<Step S7>

In step S7, the control portion 11 generates the data identification information and the destination information, based on the print data transmitted in step S2 and the destination of the print data.

<Step S8>

In step S8, the control portion 11 performs a predetermined encryption process for the data identification information generated in step S7. For example, the control portion 11 performs predetermined arithmetic processing on the content of the data identification information, based on a predetermined encryption key, thereby encrypting the data identification information. The encryption process may be performed using a conventionally known method.

<Step S9>

In step S9, the authorization portion 114 transmits the destination information generated in step S7 and the data identification information encrypted in step S8, to the one or plurality of communication terminals 20 selected in step S6.

<Step S10>

In step S10, the control portion 11 determines whether or not a reception completion notification has been received from each communication terminal 20 to which the destination information and the data identification information were transmitted in step S9, before a predetermined stand-by time has elapsed.

When determining that the reception completion notification has been received from the communication terminal 20 before the stand-by time has elapsed (Yes in S10), the control portion 11 advances the processing to step S12. On the other hand, when determining that no reception completion notification has been received from the communication terminal 20 before the stand-by time has elapsed (No in S10), the control portion 11 advances the processing to step S101.

<Step S101>

In step S101, the control portion 11 causes the operation display portion 12 to display and notify that transmission of the destination information and the data identification information to the communication terminal 20 in step S9 has failed, and ends the authorization process. It is also conceivable that, after the notification of the failed transmission, the control portion 11 may advance the processing to step S4 to urge the user to select the communication terminal(s) 20 again.

<Step S12>

In step S12, the control portion 11 causes the operation display portion 12 to display and notify that the transmission of the destination information and the data identification information to the communication terminal 20 in step S9 has succeeded, and ends the authorization process. In the case where a plurality of communication terminals 20 have been selected in step S6, the control portion 11 notifies the successful transmission of the destination information and the data identification information for only the communication terminal(s) 20 that has transmitted the reception completion notification before the stand-by time has elapsed.

[Destination Determination Process]

Next, with reference to FIG. 4, an example of the procedure of the destination determination process to be executed by the control portion 21 of the communication terminal 20 will be described. The control portion 21 executes the destination determination process when receiving the data identification information and the destination information from the information processing apparatus 10.

<Step S21>

In step S21, the second detection portion 211 determines whether or not the image forming apparatus 30 has been detected in the communication range of the near field wireless communication. Specifically, the control portion 21 determines whether or not the image forming apparatus 30 has been detected in the Bluetooth communication range.

When determining that the image forming apparatus 30 has been detected (Yes in S21), the second detection portion 211 advances the processing to step S22. When the image forming apparatus 30 has not been detected (No in S21), the second detection portion 211 waits for detection of the image forming apparatus 30 in step S21.

<Step S22>

In step S22, the destination determination portion 212 determines whether or not the image forming apparatus 30 detected in step S21 is the destination of the print data in step S2 of the authorization process. Specifically, the destination determination portion 212 determines whether or not the image forming apparatus 30 is the destination of the print data, based on the destination information transmitted from the information processing apparatus 10 in step S9 of the authorization process.

When determining that the image forming apparatus 30 detected in step S21 is the destination of the print data (Yes in S22), the destination determination portion 212 advances the processing to step S23. On the other hand, when determining that the image forming apparatus 30 is not the destination of the print data (No in S22), the destination determination portion 212 advances the processing to step S21 and again waits for detection of the image forming apparatus 30 in the Bluetooth communication range. It is conceivable that when the destination determination portion 212 determines that the image forming apparatus 30 detected in step S21 is not the destination of the print data after the reception of the destination information, the image forming apparatus 30 may be excluded from the targets of the destination determination process until the next destination information is received.

<Step S23>

In step S23, the second transmission portion 213 transmits the data identification information to the image forming apparatus 30 detected in step S21. Thereby, in the image forming apparatus 30, printing of the print data by the second user corresponding to the communication terminal 20 is permitted in the later-described printing permission process.

[Print Data Reception Process]

Next, with reference to FIG. 5, an example of the procedure of the print data reception process to be executed by the data receiving portion 353 of the image forming apparatus 30 will be described.

<Step S31>

In step S31, the data receiving portion 353 determines whether or not the print data has been received from the information processing apparatus 10.

When determining that the print data has been received from the information processing apparatus 10 (Yes in S31), the data receiving portion 353 advances the processing to step S32. On the other hand, when the print data from the information processing apparatus 10 has not been received (No in S31), the data receiving portion 353 waits for reception of the print data in step S31.

<Step S32>

In step S32, the data receiving portion 353 specifies the first user corresponding to the information processing apparatus 10 from which the print data received in step S31 has been transmitted. Specifically, the data receiving portion 353 obtains the apparatus identification information of the information processing apparatus 10 that has transmitted the print data, and specifies, as the first user, the user of the image forming apparatus 30 corresponding to the apparatus identification information stored in the data storage portion 39.

<Step S33>

In step S33, the data receiving portion 353 stores the print data received in step S31, in the box corresponding to the first user specified in step S32. Thereby, when the first user logs in to the image forming apparatus 30, printing of the print data by the first user is permitted.

[Printing Permission Process]

Next, with reference to FIG. 6, an example of the procedure of the printing permission process to be executed by the control portion 35 of the image forming apparatus 30 will be described. When receiving the data identification information from the communication terminal 20, the control portion 35 executes the printing permission process. In addition, the control portion 35 executes the printing permission process for each received data identification information.

<Step S41>

In step S41, the control portion 35 subjects the received data identification information to a decryption process corresponding to the encryption process performed in step S8 of the authorization process. For example, the control portion 35 performs predetermined arithmetic processing on the content of the data identification information, based on a decryption key corresponding to the encryption key used for the encryption process, thereby decrypting the data identification information. The decryption process may be performed using a conventionally known method.

<Step S42>

In step S42, the control portion 35 determines whether or not there is the print data corresponding to the data identification information decrypted in step S41. Specifically, the control portion 35 determines that there is the print data corresponding to the data identification information, when the data storage portion 39 stores therein the print data specified by the filename of the print data, the username of the first user, and the like which are included in the data identification information.

When determining that there is the print data corresponding to the data identification information (Yes in S42), the control portion 35 advances the processing to step S43. On the other hand, when determining that there is no print data corresponding to the data identification information (No in S42), the control portion 35 deletes the data identification information, and thereafter, ends the printing permission process. As an example of the case where there is no print data corresponding to the data identification information, a case is conceivable where printing of the print data has already been performed by the first user or the second user corresponding to another communication terminal 20 to which the print authority is given.

<Step S43>

In step S43, the printing permission portion 354 specifies the second user corresponding to the communication terminal 20 from which the received data identification information has been transmitted. Specifically, the printing permission portion 354 obtains the pairing ID of the communication terminal 20 which has transmitted the data identification information, and specifies, as the second user, the user of the image forming apparatus 30 corresponding to the pairing ID stored in the data storage portion 39.

<Step S44>

In step S44, the printing permission portion 354 moves the print data corresponding to the received data identification information to the box corresponding to the second user specified in step S43. Specifically, the printing permission portion 354 stores the print data in the box corresponding to the second user, and deletes the print data from the box corresponding to the first user, thereby moving the print data. Thereby, when the second user logs in to the image forming apparatus 30, printing of the print data by the second user is permitted.

It is conceivable that when moving the print data to the box corresponding to the second user, the printing permission portion 354 may add, to the print data, information indicating that setting of the print conditions cannot be changed. Thereby, the print conditions set by the requester at the time of transmitting the print data are prevented from being changed by the proxy despite the intention of the requester. The method of permitting printing of the print data in step S44 is not limited thereto. For example, it is conceivable that the printing permission portion 354 may allow the second user to refer to and print only the print data in the box of the first user, by changing the authority information of the box.

<Step S45>

In step S45, the printing permission portion 354 determines whether or not the elapsed time from when the print data is moved to the box corresponding to the second user in step S44 exceeds the time limit.

When determining that the elapsed time exceeds the time limit (Yes in S45), the printing permission portion 354 advances the processing to step S451. On the other hand, when determining that the elapsed time does not exceed the time limit (No in S45), the printing permission portion 354 advances the processing to step S46.

<Step S451>

In step S451, the printing permission portion 354 returns the print data having been moved to the box corresponding to the second user in step S44, to the box corresponding to the first user. Thereby, the first user or another second user is allowed to print the print data. Specifically, the control portion 35 stores the print data in the box corresponding to the first user, and thereafter, deletes the print data from the box corresponding to the second user.

<Step S46>

In step S46, the control portion 35 determines whether or not the second user has logged in to the image forming apparatus 30. Specifically, the control portion 35 causes the operation display portion 36 to display the authentication screen in accordance with an operation performed on the operation display portion 36 by the user. Then, the control portion 35 causes the user to log in, based on the login information inputted to the authentication screen, and determines whether or not the logged-in user is the second user. The process of causing the user to log in is executed by the authentication control portion 351 of the control portion 35.

When determining that the second user has logged in to the image forming apparatus 30 (Yes in S46), the control portion 35 advances the processing to step S47. On the other hand, when the second user has not logged in to the image forming apparatus 30 (No in S46), the control portion 35 advances the processing to step S45, and waits for login of the second user until the time limit is exceeded. Thereby, when the second user is not likely to log in to the image forming apparatus 30 and print the print data, the state where printing of the print data is permitted for the second user is canceled.

<Step S47>

In step S47, the access control portion 352 permits access to the box corresponding to the logged-in second user. Thereby, the second user is permitted to print the print data.

<Step S48>

In step S48, the printing permission portion 354 determines whether or not the authentication control portion 351 has executed the logout process and the second user has logged out from the image forming apparatus 30.

When determining that the second user has logged out from the image forming apparatus 30 (Yes in S48), the printing permission portion 354 cancels the permission of access to the box corresponding to the second user, and advances the processing to step S451. On the other hand, when determining that the second user has not logged out from the image forming apparatus 30 (No in S48), the printing permission portion 354 advances the processing to step S49.

<Step S49>

In step S49, the printing permission portion 354 determines whether or not an execution operation for the printing process has been performed with respect to the print data having been moved to the box corresponding to the second user in step S44.

When determining that an execution operation for the printing process of the print data has been performed (Yes in S49), the printing permission portion 354 advances the processing to step S50. On the other hand, when no execution operation for the printing process of the print data has been performed (No in S49), the printing permission portion 354 advances the processing to step S48, and waits for an execution operation for the printing process of the print data until the second user logs out from the image forming apparatus 30. Thereby, when the second user logs out from the image forming apparatus 30 without printing the print data, the permission for the second user to print the print data is canceled.

<Step S50>

In step S50, the control portion 35 executes the printing process of the print data for which the execution operation has been performed in step S49. It is conceivable that if the image forming apparatus 30 is configured to be able to collect, for each user, printing records such as the number of printed sheets, toner consumption, or the like, the control portion 35 may update the printing records for the first user, based on the printing result of the print data, when printing of the print data is performed by the second user. Thereby, in the image forming apparatus 30, it is possible to collect, for each user, the printing records based on the actual condition of printing.

<Step S51>

In step S51, the control portion 35 transmits information indicating the second user together with the data identification information to the information processing apparatus 10 corresponding to the first user. Thereby, in the information processing apparatus 10, the second notification portion 115 can display, on the operation display portion 12, that the printing process of the print data has been executed, and can display the username of the second user to give notice of the second user. Accordingly, the first user can know the execution of the printing process of the print data, and the second user as a proxy who has performed printing of the print data on behalf of the first user.

<Step S52>

In step S52, the first notification portion 355 displays the username of the first user on the operation display portion 36 to give notice of the first user. Thereby, the second user can know the first user who is the requester of printing of the print data, and can send the printed matter to the first user.

As described above, in the printing system 100, the information processing apparatus 10, when transmitting the print data, detects the communication terminals 20 existing in the communication range of the near field wireless communication. Then, the information processing apparatus 10 can give the print authority of the print data to one or a plurality of communication terminals 20 selected from among the detected communication terminals 20. Therefore, it is not necessary to previously register, in the database, users sitting near the information processing apparatus 10 as candidates of the second user, and thus the database can be omitted. Further, when, in the printing system 100, the first user requests proxy printing of the print data transmitted to the image forming apparatus 30, the communication terminals 20 owned by the second users who are not near the information processing apparatus 10 are not detected. Therefore, the first user is saved from the trouble of visually confirming the presence states of the second users.

It is conceivable that the terminal selection portion 113 of the information processing apparatus 10 skips step S5, and automatically selects, in step S6, all the communication terminals 20 detected by the first detection portion 112 as the targets to which the print authority is given. Alternatively, it is conceivable that the terminal selection portion 113 skips step S5, and automatically selects, in step S6, one or a plurality of communication terminals 20 as the targets to which the print authority is given, from among the communication terminals 20 detected by the first detection portion 112, according to a predetermined priority order of the communication terminals 20.

Furthermore, it is conceivable that when the data identification information has been transmitted, the printing permission portion 354 of the image forming apparatus 30 executes the printing process for the print data. That is, it is conceivable that when the communication terminal 20 having the print authority of the print data approaches the image forming apparatus 30, the image forming apparatus 30 automatically prints the print data, without the second user's operation on the operation display portion 36. In this case, it is conceivable that the second transmission portion 213 of the communication terminal 20 is configured to transmit the data identification information to the image forming apparatus 30 in accordance with the user's transmission operation on an operation display portion (not shown) provided in the communication terminal 20.

Further, in the printing system 100, the near field wireless communication by which the information processing apparatus 10, the communication terminals 20, and the image forming apparatus 30 can communicate with each other is not limited to the wireless communication based on the Bluetooth. For example, the near field wireless communication may be wireless communication based on wireless LAN or ZigBee (trademark).

Another Embodiment

In the printing system 100, the information processing apparatus 10 transmits the data identification information and the destination information to the communication terminal 20 to give the print authority of the print data to the communication terminal 20. However, the method of giving the print authority of the print data to the communication terminal 20 in the printing system 100 is not limited thereto. Hereinafter, another method of giving the print authority of the print data to the communication terminal 20 in the printing system 100 according to another embodiment of the present disclosure will be described.

Specifically, in the printing system 100 according to the other embodiment, the contents of the processes performed by the authorization portion 114 of the information processing apparatus 10 and the printing permission portion 354 of the image forming apparatus 30 are different from those described above. In addition, in the printing system 100, the destination determination process is not performed in the communication terminal 20, and it is determined, on the image forming apparatus 30 side, whether or not the communication terminal 20 existing in the communication range of the near field wireless communication has the print authority. Hereinafter, the contents of the processes performed by the authorization portion 114 and the printing permission portion 354 will be described.

The authorization portion 114 associates terminal identification information for identifying the communication terminal 20 selected by the terminal selection portion 113 with the print data transmitted from the data transmission portion 111, thereby giving the print authority of the print data to the communication terminal 20. For example, the terminal identification information is the pairing ID of the communication terminal 20.

The printing permission portion 354 detects the communication terminal 20 existing in the communication range of the near field wireless communication. When the print data corresponding to the terminal identification information of the detected communication terminal 20 is stored in the data storage portion 39, the printing permission portion 354 determines that the communication terminal having the print authority exists in the communication range of the near field wireless communication, and permits printing of the print data corresponding to the terminal identification information. Specifically, when the pairing ID of the detected communication terminal 20 is included in the pairing IDs which are associated with the print data stored in the data storage portion 39, the printing permission portion 354 determines that the print data corresponding to the terminal identification information of the communication terminal 20 is stored in the data storage portion 39.

[Authorization Process]

Figure 7:
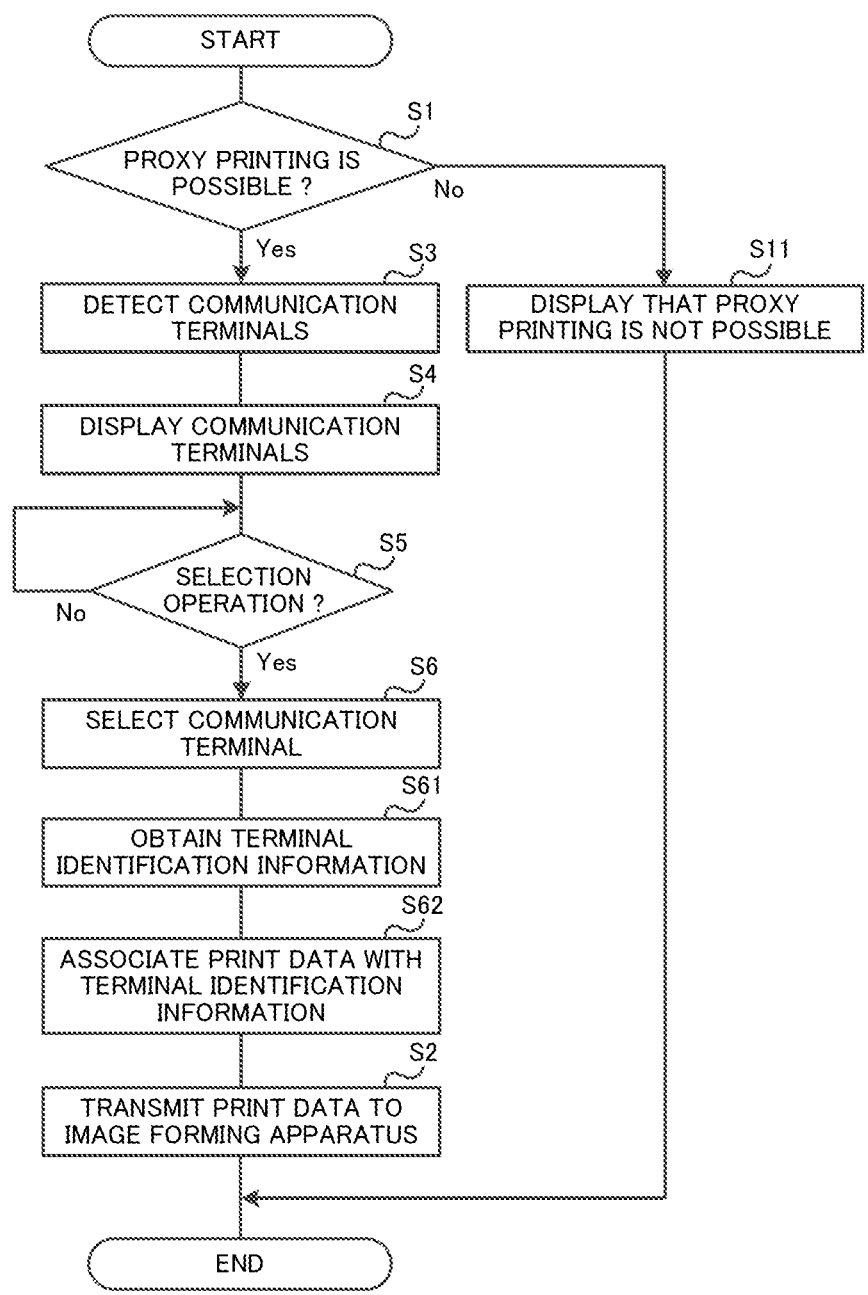
FIG. 7 is a flowchart showing an authorization process executed by an information processing apparatus according to another embodiment of the present disclosure.

Hereinafter, with reference to FIG. 7, the authorization process to be executed by the control portion 11 of the information processing apparatus 10 in the printing system 100 according to the other embodiment will be described. The same steps as those of the authorization process shown in FIG. 3 are given the same reference numerals, and description thereof will be omitted. Specifically, in the authorization process shown in FIG. 7, steps S61 and S62 are executed instead of steps S7 to S10, S101, and S12 shown in FIG. 3. In addition, in the authorization process shown in FIG. 7, step S2 shown in FIG. 3 is executed after step S62.

<Step S61>

In step S61, the control portion 11 obtains the terminal identification information of the communication terminal 20 selected in step S6. Specifically, the control portion 11 obtains the pairing ID of the communication terminal 20.

<Step S62>

In step S62, the control portion 11 associates the terminal identification information obtained in step S61 with the print data. Specifically, the control portion 11 adds the pairing ID of the communication terminal 20 to the print data. In the following step S2, the control portion 11 transmits, to the image forming apparatus 30, the print data to which the pairing ID of the communication terminal 20 is added.

[Print Data Reception Process]

Figure 5:
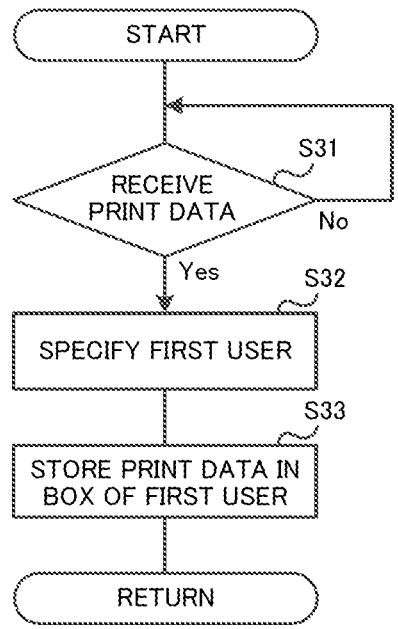
FIG. 5 is a flowchart showing a print data reception process executed by the image forming apparatus according to the embodiment of the present disclosure.
Figure 6:
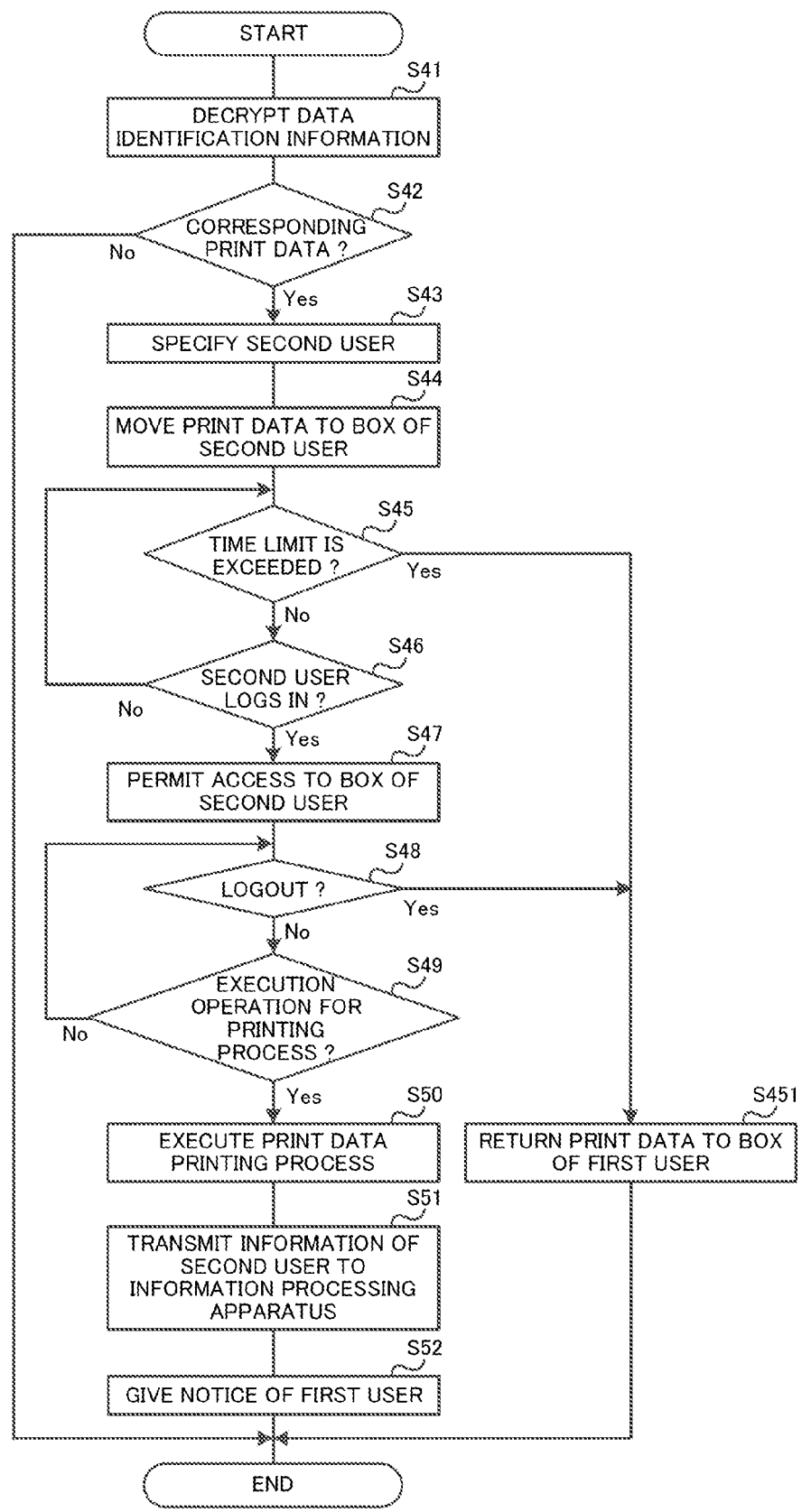
FIG. 6 is a flowchart showing a printing permission process executed by the image forming apparatus according to the embodiment of the present disclosure.

Since the steps of the print data reception process to be executed by the control portion 35 of the image forming apparatus 30 in the printing system 100 according to the other embodiment are the same as those of the print data reception process shown in FIG. 5, repeated description is not necessary.

[Printing Permission Process]

Figure 8:
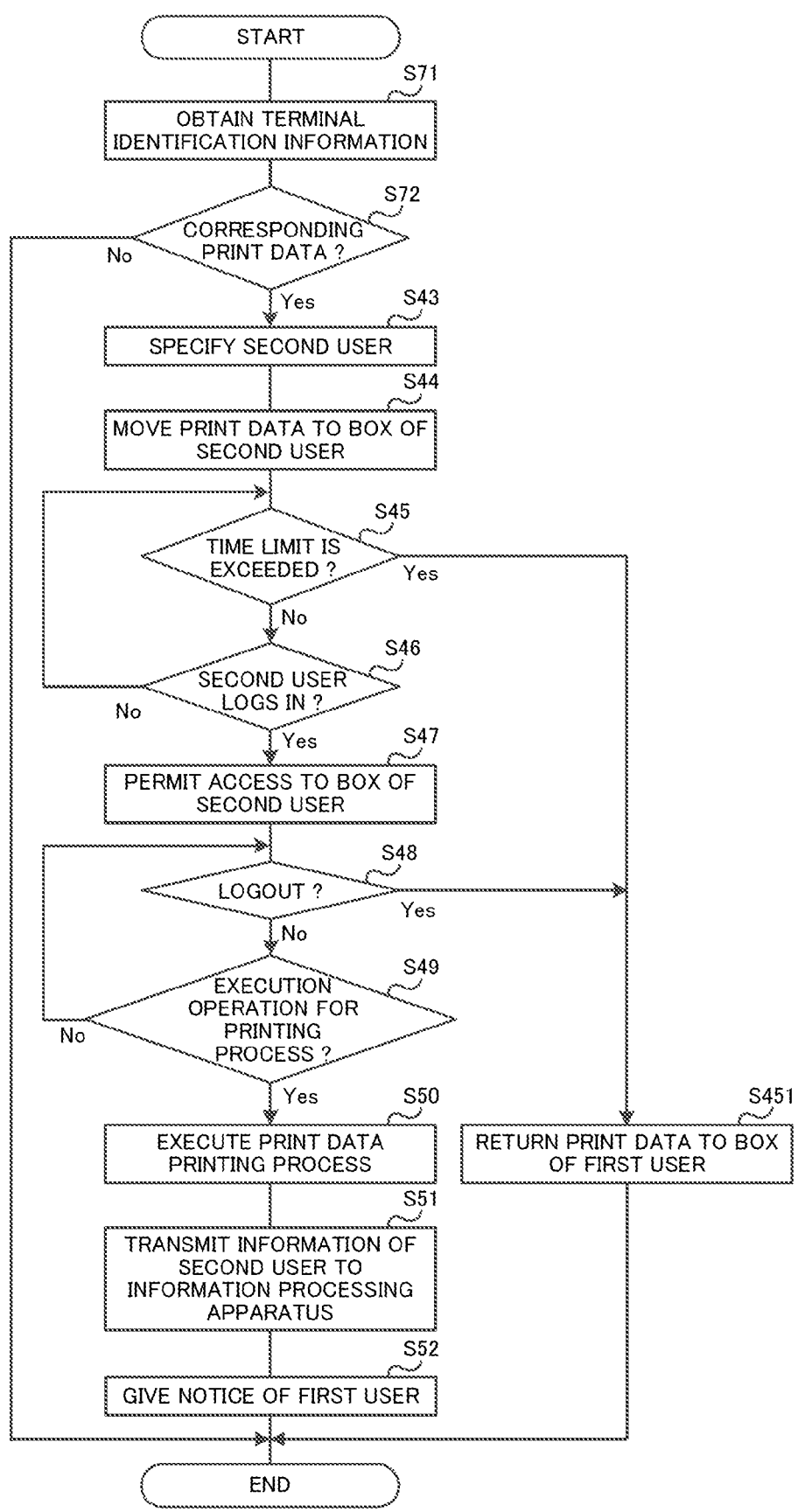
FIG. 8 is a flowchart showing a printing permission process executed by an image forming apparatus according to another embodiment of the present disclosure.

Hereinafter, with reference to FIG. 8, the printing permission process to be executed by the control portion 35 of the image forming apparatus 30 in the printing system 100 according to the other embodiment will be described. The same steps as those of the printing permission process shown in FIG. 6 are given the same reference numerals, and description thereof will be omitted. Specifically, in the printing permission process shown in FIG. 8, steps S71 and S72 are executed instead of steps S41 to S42 shown in FIG. 6. When the printing permission portion 354 detects the communication terminal 20 existing in the communication range of the near field wireless communication, the control portion 35 executes the printing permission process. In addition, the control portion 35 executes the printing permission process for each detected communication terminal 20.

<Step S71>

In step S71, the control portion 35 obtains the terminal identification information of the communication terminal 20 detected by the printing permission portion 354. Specifically, the control portion 35 obtains the pairing ID of the communication terminal 20.

<Step S72>

In step S72, the control portion 35 determines whether or not the print data corresponding to the terminal identification information of the communication terminal 20 detected by the printing permission portion 354 is stored in the data storage portion 39. Specifically, when the pairing ID of the communication terminal 20 detected by the printing permission portion 354 is included in the pairing IDs which are associated with the print data stored in the data storage portion 39, the control portion 35 determines that the print data corresponding to the terminal identification information of the communication terminal 20 is stored in the data storage portion 39.

When determining that the print data corresponding to the terminal identification information of the communication terminal 20 is stored in the data storage portion 39 (Yes in S72), the control portion 35 advances the processing to step S43. On the other hand, when determining that the print data corresponding to the terminal identification information of the communication terminal 20 is not stored in the data storage portion 39 (No in S72), the control portion 35 ends the printing permission process.

As described above, in the printing system 100 according to the other embodiment, the destination determination process is not performed in the communication terminal 20, and it is determined, on the image forming apparatus 30 side, whether or not the communication terminal 20 existing in the communication range of the near field wireless communication has the print authority. Therefore, the system configuration of the communication terminal 20 can be simplified.

Generally, when print data is printed by using a confidential printing function, a user who requests proxy printing may select another user from a list of candidates registered in a database provided in a printing system in advance. In this case, however, it is necessary to provide the database in the printing system. Further, in the case where a user sitting near the user who requests proxy printing is registered as a candidate in the database, if the desk of this user is changed due to personnel transfer or rearrangement of desks, it causes a trouble of updating the contents registered in the database. Further, since another user as a candidate is selected based on the preregistered database regardless of presence/absence of the other user, there may occur a situation where the other user is not at his/her desk and therefore cannot perform proxy printing. Therefore, the user needs to confirm the presence/absence of the other user when requesting the other user to perform proxy printing. In contrast, in the printing system 100 according to the embodiment of the present disclosure, a user is saved from the trouble that occurs when the user requests another user sitting near him/her for proxy printing by utilizing the confidential printing function, and further, management of the database is not necessary.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A printing system including an information processing apparatus and an image forming apparatus, wherein
the information processing apparatus comprises:
a data transmission portion configured to transmit print data to the image forming apparatus;
a first detection portion configured to detect communication terminals existing in a communication range of a near field wireless communication when a security level of the print data is a predetermined level that has been set in advance;
a terminal selection portion configured to select one or a plurality of the communication terminals from among the communication terminals detected by the first detection portion; and
an authorization portion configured to give print authority of the print data transmitted from the data transmission portion, to the communication terminal selected by the terminal selection portion, and
the image forming apparatus includes:
a printing permission portion configured to permit printing of the print data corresponding to the print authority, when the communication terminal having the print authority exists in the communication range of the near field wireless communication;
a plurality of storage portions corresponding to respective users;
an authentication control portion configured to cause any of the users to log in, according to a predetermined authentication operation;
an access control portion configured to, when there is a login performed by the authentication control portion, permit access to the storage portion corresponding to the user who has logged in; and
a data receiving portion configured to, when the print data is transmitted from the information processing apparatus, specify a first user corresponding to the information processing apparatus and stores the print data in the storage portion corresponding to the first user,
when the communication terminal to which the print authority is given exists in the communication range of the near field wireless communication, the printing permission portion specifies a second user corresponding to the communication terminal, and stores the print data corresponding to the print authority possessed by the communication terminal into the storage portion corresponding to the second user, thereby permitting printing of the print data corresponding to the print authority,
the image forming apparatus further includes a first notification portion configured to give notice of the first user when the print data corresponding to the print authority has been printed, and
the information processing apparatus further includes a second notification portion configured to, when the print data corresponding to the print authority has been printed, give notice that a printing process of the print data has been executed and give notice of the second user.

2. The printing system according to claim 1 further including one or a plurality of the communication terminals, wherein
the authorization portion transmits, to the communication terminal selected by the terminal selection portion, data identification information for identifying the print data transmitted from the data transmission portion, and destination information indicating a destination of the print data, thereby giving the print authority of the print data to the communication terminal,
each communication terminal includes:
a second detection portion configured to detect the image forming apparatus existing in the communication range of the near field wireless communication;
a destination determination portion configured to determine, based on the destination information, whether or not the image forming apparatus detected by the second detection portion is the destination of the print data; and
a second transmission portion configured to transmit the data identification information to the image forming apparatus determined to be the destination of the print data by the destination determination portion,
the image forming apparatus includes a storage portion configured to store therein the print data transmitted from the information processing apparatus, and
the printing permission portion, when the data identification information is transmitted from the communication terminal, determines that the communication terminal having the print authority exists in the communication range of the near field wireless communication, and permits printing of the print data corresponding to the data identification information.

3. The printing system according to claim 1, wherein
the authorization portion associates terminal identification information for identifying the communication terminal selected by the terminal selection portion with the print data transmitted from the data transmission portion, thereby giving the print authority of the print data to the communication terminal,
the image forming apparatus includes a storage portion configured to store therein the print data transmitted from the information processing apparatus, and
the printing permission portion
detects the communication terminal existing in the communication range of the near field wireless communication,
determines that the communication terminal having the print authority exists in the communication range of the near field wireless communication, when the print data corresponding to the terminal identification information of the detected communication terminal is stored in the storage portion, and
permits printing of the print data corresponding to the terminal identification information.

4. The printing system according to claim 1, wherein the terminal selection portion selects one or a plurality of the communication terminals from among the communication terminals detected by the first detection portion, in accordance with a preset selection operation.

5. The printing system according to claim 1, wherein the terminal selection portion automatically selects all the communication terminals detected by the first detection portion.

6. The printing system according to claim 1, wherein the printing permission portion deletes the print data stored in the storage portion corresponding to the second user, from the storage portion corresponding to the second user, on the condition that the second user logs out or that a preset time limit is exceeded.

* * * * *